United States Patent

Vincent et al.

[19]

[11] Patent Number: 6,048,108
[45] Date of Patent: Apr. 11, 2000

[54] OPTICAL FIBER SPLICING MODULE

[75] Inventors: Alain Vincent, Juilly; Michel Reslinger, Bondoufle; Gérard Godard, Noiseau; Philippe Laurency, Colombes, all of France

[73] Assignee: Alcatel, Paris, France

[21] Appl. No.: 08/998,805

[22] Filed: Dec. 29, 1997

[30] Foreign Application Priority Data

Dec. 30, 1996 [FR] France .................................. 96 16189

[51] Int. Cl.$^7$ ................................................. G02B 6/255
[52] U.S. Cl. ............................. 385/98; 385/70; 385/137
[58] Field of Search ........................ 385/70.95, 97–99, 385/65, 137

[56] References Cited

U.S. PATENT DOCUMENTS

| | | | |
|---|---|---|---|
| 4,208,095 | 6/1980 | Malsot ................................. | 350/96.21 |
| 4,688,886 | 8/1987 | Stoerk ................................. | 350/96.21 |
| 4,730,892 | 3/1988 | Anderson et al. .................... | 350/96.21 |
| 5,125,057 | 6/1992 | Aberson, Jr. et al. ............... | 385/65 |

FOREIGN PATENT DOCUMENTS

| | | | |
|---|---|---|---|
| 0029383 A1 | 5/1981 | European Pat. Off. .......... | G02B 7/26 |
| 2696841A1 | 4/1994 | France .............................. | G02B 6/38 |
| 2179177 | 2/1987 | United Kingdom ............. | G02B 6/36 |

OTHER PUBLICATIONS

Patent Abstracts of Japan, vol. 001, No. 035 (E–012), Apr. 15, 1977 corresponding to JP 51 133042 A (Sumitomo Electric Ind Ltd) dated Nov. 18, 1976.

Patent Abstracts of Japan, vol. 007, No. 210 (P–223), Sep. 16, 1983 corresponding to JP 58 105115 A (Fumitsu KK) dated Jun. 22, 1983.

*Primary Examiner*—John D. Lee
*Assistant Examiner*—Victoria D. Hao
*Attorney, Agent, or Firm*—Sughrue, Mion, Zinn, Macpeak & Seas, PLLC

[57] ABSTRACT

An optical fiber splicing module includes a receiving housing having a longitudinal cavity with two fiber insertion orifices through two end walls of the cavity, a fiber immobilizing member and a pressing arrangement in the cavity and a closure cap that can be clipped to the housing. The fiber immobilizing member substantially closes off the cavity and carries the pressing arrangement which is therefore received facing a groove in the bottom of the cavity and aligned with the orifices. The cap can be clipped to the housing in such a way as to define two positions of the member in the cavity, for allowing the fibers to pass and for immobilizing them in the groove.

6 Claims, 3 Drawing Sheets

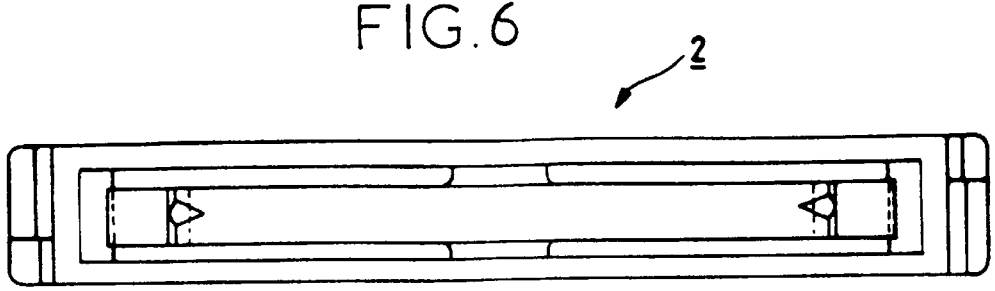
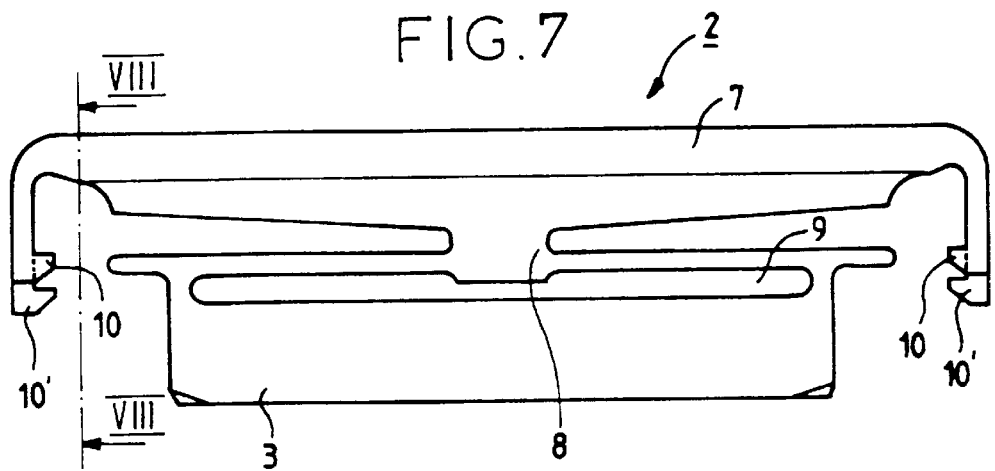
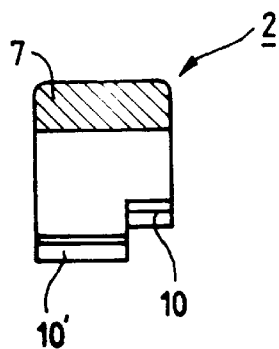
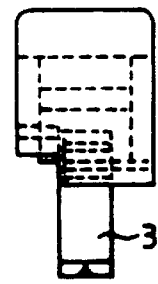

OPTICAL FIBER SPLICING MODULE

BACKGROUND OF THE INVENTION

1. Field of the Invention

The invention concerns an optical splicing module for butt jointing two optical fibers and in particular a module designed to be used with a jointing tool for carrying out at least some of the operations necessary for jointing.

2. Description of the Prior Art

Butt jointing one or two optical fibers entails delicate operations including in particular shaping the end of each fiber to be butt jointed, accurately positioning the end(s) to assure high quality optical continuity and fastening each fiber after appropriate positioning.

Document U.S. Pat. No. 5,159,653 describes a metal module for butt jointing fibers in a receiving housing having a longitudinal cavity into the bottom of which the fibers each enter through a different orifice through an end wall of the housing. A fiber immobilizing member is accommodated in the cavity under a cover which is fixed inside the cavity and which contributes to immobilizing the fibers by wedging them between two parts that can be folded one towards the other in a groove at the level of the bend where these two parts of the immobilizing member join together.

The invention proposes a splicing module for butt jointing two optical fibers that is more particularly designed to be used with a jointing tool itself designed to carry out the sequence of operations necessary for jointing and in particular the insertion of the fibers into the module and their immobilization after being placed end-to-end.

SUMMARY OF THE INVENTION

The invention consists in splicing module for butt jointing two optical fibers including a receiving housing having a longitudinal cavity with two fiber insertion orifices through two opposite end walls and a longitudinal groove in the bottom of the cavity of the housing, an immobilizing member being accommodated in the cavity, pressing means received in the cavity to apply a holding pressure to fiber portions inserted into the cavity via the orifices, a cap for closing the cavity, and complementary clip fixing means on the housing and the cap, wherein the immobilizing member carries the pressing means which are therefore received in the cavity facing the groove and substantially closes off the cavity, the orifices open directly into the groove for reception of the fibers end-to-end therein, and the complementary fixing means are adapted to hold the immobilizing member either in a first position in which a fiber passage is left between the pressing means and the groove or in a second position in which the pressing means are pushed into the bottom of the cavity to immobilize the fibers present in the groove.

Advantageously:

The pressing means have a shape substantially complementary to that of the cavity and a longitudinal pressure distribution opening along the groove.

The immobilizing member, the pressing means and the cap form a one-piece plastics material assembly having a middle pillar connecting the cap to the pressing means.

The fixing means on the module and/or the cap are at two different heights to define the first and second positions of the immobilizing member.

The invention, its features and its advantages are explained in the following description with reference to the following drawings.

BRIEF DESCRIPTION OF THE DRAWINGS

FIGS. 6 through 9 respectively show a bottom view, a sectional front view, a sectional righthand side view and a lefthand side view of an immobilizing member of a splicing module in accordance with the invention.

DETAILED DESCRIPTION OF THE PREFERRED EMBODIMENT

Figure 1:
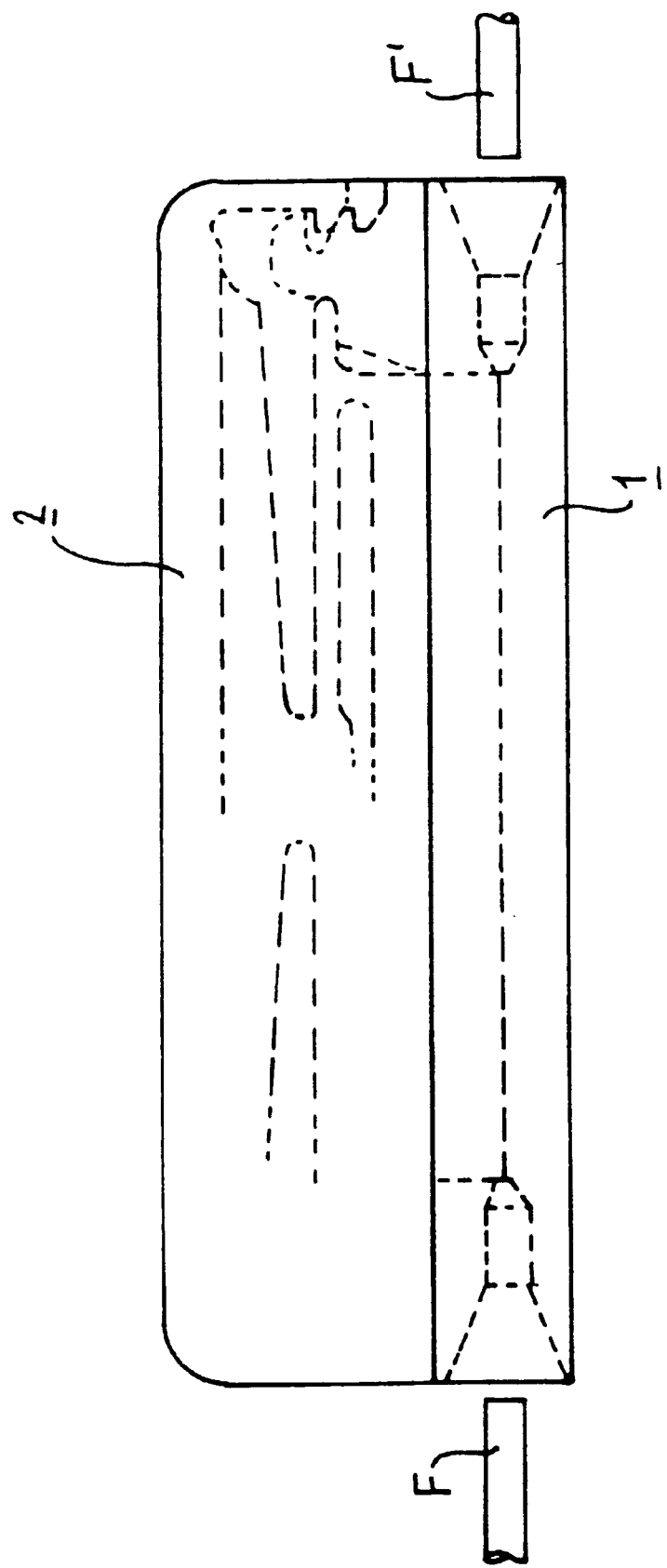
FIG. 1 shows a front view of an assembled module.

As mentioned above and as shown in FIG. 1, the splicing module of the invention is used to butt joint two optical fibers. To this end it includes a receiving housing 1 adapted to receive two fibers F, F' and an immobilizing member 2 adapted to cooperate with the receiving housing 1 to hold the two optical fibers in position after they have been positioned end-to-end in the housing, to assure satisfactory optical continuity between them, by virtue of arrangements known in the art.

Figure 2:
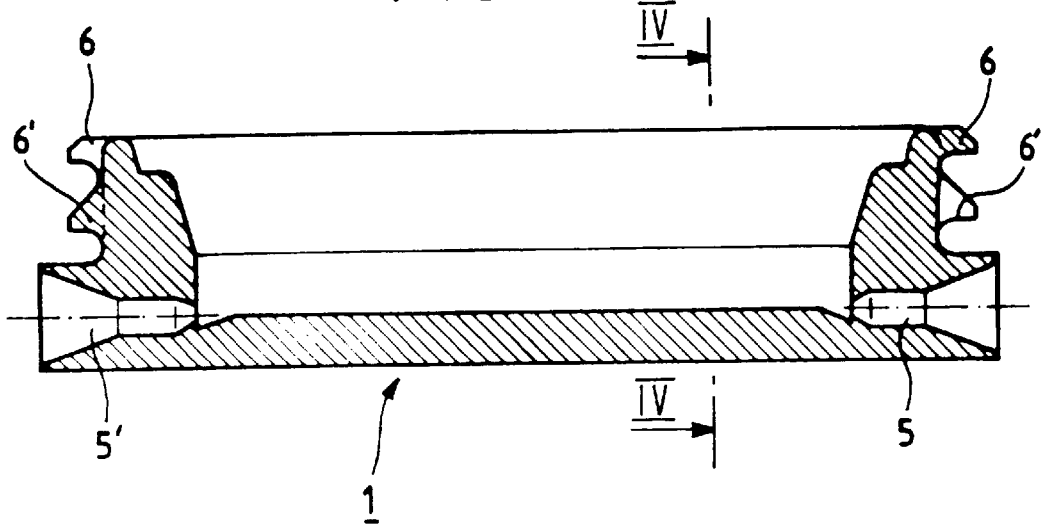
FIGS. 2 through 5 respectively show a sectional front view, a righthand side view, a sectional lefthand side view and a top view of a receiving housing of a splicing module of the invention.
Figure 3:
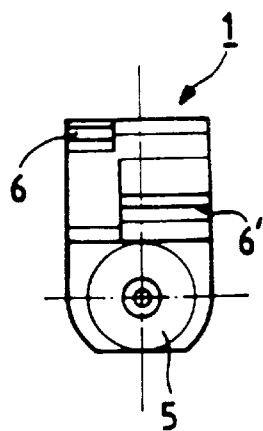
Figure 4:
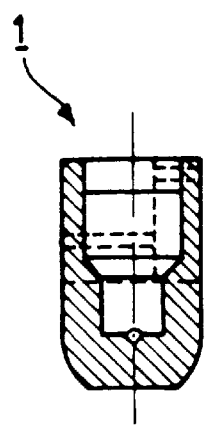
Figure 5:
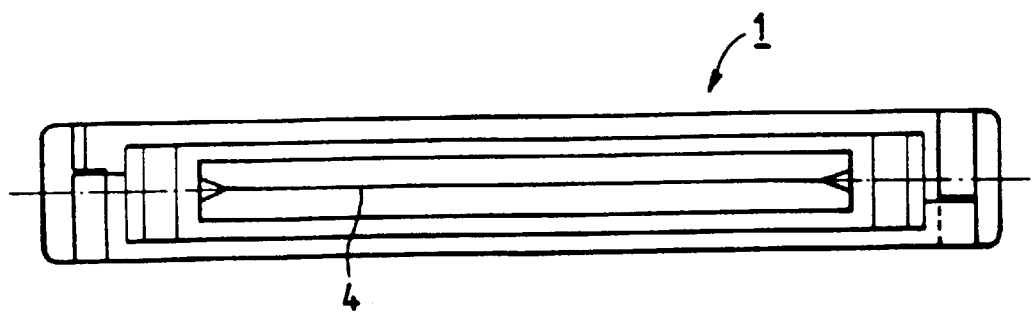

The receiving housing 1 is molded from a material such as a thermoplastics resin and has a rectangular parallelepiped shape with a longitudinal cavity open on one of its larger faces to receive a part 3 of the immobilizing member 2 (see FIGS. 2, 3 and 4).

The bottom of the cavity in the receiving housing 1 has a longitudinal central groove 4 to receive two fibers to be butt jointed which enter this cavity via orifices 5 in opposite lateral walls of the housing at the level of the bottom of the cavity and each at one end of the groove 4.

Because of its inherent shape, or possibly because of the shape of an end-piece that it receives, each orifice 5 widens towards the outside of the housing to facilitate the entry of a fiber and has a particular diameter in the part 5 which extends towards the interior of the cavity for correct centering of the end to be jointed of a fiber of given diameter, the diameter of the orifices or of the end-pieces that they contain possibly being chosen according to those of the fibers to be jointed. The latter are adapted to butt together in the middle part of the longitudinal groove 4.

The receiving housing 1 further includes means for fixing the immobilizing member 2 in a first position allowing free passage of the fibers in the groove 4 between the bottom of this groove and the immobilizing member 2 or in a second position in which the immobilizing member presses onto the bottom of the groove 4 any fiber portion inserted between itself and this groove.

Here these means are disposed transversely to the ends of the housing, externally of the latter, and are in the form of projecting detents 6, 6' which are offset in height and in width in the embodiment shown. The detents 6 at opposite ends of the housing and at the same height are for attaching the immobilizing member to the receiving housing in the first of the positions mentioned above. The detents 6' at a lower level than the detents 6 are for holding the immobilizing member in the second of these positions relative to the receiving housing.

In the embodiment shown, each detent 6 is narrower than the detent 6' below it and is offset laterally relative to it, as can be seen in FIGS. 2 and 3.

The immobilizing member 2 is made from the same material as the receiving housing 1, for example, and has a part 3 which is here used to apply pressure to the portions of fiber inserted via the orifices 5 between itself and the groove 4 of a receiving housing 1 to hold them in position when the immobilizing member 2, including it, is pushed into the second of the positions mentioned above relative to the receiving housing 1 to which it is fitted.

In the embodiment shown, and as shown in FIGS. 7, 8 and 9, the pressing part 3 has a shape complementary to that of the cavity in the receiving housing 1 which receives it, i.e. a rectangular parallelepiped shape in this instance. It is fixed to a cap 7 which closes the cavity in the receiving housing 1 that it closes off when the immobilizing member 2 is in position. The connection between the pressing part 3 and the cap 7 of the immobilizing member 2 is assured by a short resilient central pillar 8 allowing slight angular play between the pressing part and the cap.

An opening 9 extends the major part of the length of the pressing part 3, here near the central pillar 8, and opens laterally on either side of the pressing part. It enables the pressure exerted by the pillar to be applied to the pressing part proper at its longitudinal ends. An optimal pressure distribution is obtained in this way over the fiber portions immobilized by the pressing part in the groove 4 in the receiving housing.

The immobilizing member 2 includes means for fixing it to a receiving housing 1 complementary to the means that the latter comprises for this purpose and which form means for closing the cavity in this housing in conjunction with the cap 7 incorporating them.

In the embodiment shown, the longitudinal ends of the cap 7 include clipping lugs with detents 10, 10' respectively adapted to cooperate with the detents 6, 6' on the receiving housing 1.

The inwardly oriented detents 10, 10' are therefore also offset in height and in width and the detents 10' farthest from the upper part of the cap 7 are also wider than the detents 10, both being at least approximately the same width as the detents 6 or 6' with which they respectively cooperate.

There is provision to joint two fibers directly by means of the splicing module described hereinabove after inserting each fiber into one of the orifices 5 of the housing after these fibers have been cleaved in a particular manner at their jointing end.

This implies positioning the cleaved ends in the intended position before immobilizing them by moving the immobilizing member of the module from its first position to its second position. This positioning is essentially assured by the centering part of each orifice, by the groove 4 aligned with the centering parts of the two orifices in the receiving housing and by the allowed travel in translation of the means of the tool, not shown, that insert the fibers into the orifices in the receiving housing in a preferred embodiment of the module.

The module of the invention is adapted to position the fibers in a receiving housing 1 the immobilizing member 2 of which is in the first of its positions in which each of the two fibers to be jointed can pass between the pressing means 3 of the member and the bottom of the cavity in the housing.

Because of the arrangement of the clipping members on the cap and the complementary means on the receiving housing, the immobilizing member can move from the first position to the second position in which the pressing means are pushed into the bottom of the cavity as soon as the fibers have been placed end-to-end. This end-to-end placement is preferably effected by simultaneous penetration of the ends of the fibers into a droplet of index matching liquid previously placed in the middle of the bottom of the housing before fitting the cap and inserting the fibers.

Moving the immobilizing member from one position to the other is effected simply by pressing this member down into the cavity in the housing, this preferably being effected by means of a jointing tool on which the housing is held in a fixed position with the bottom of the housing horizontal or quasi-horizontal and the immobilizing member pressed vertically or quasi-vertically by means incorporated in the tool. This means are of the mechanical actuator type, for example, and press on the cap so as simultaneously to clip the lugs carrying the detents 10' on either side of the cover over the complementary detents 6' of the housing at the end of this movement. In a preferred embodiment of jointing tool the pressure to press in the cap is provided by two plungers operated simultaneously and each bearing on one end of the cap.

The immobilizing member 2 then applies pressure to the ends of the fibers inserted into the cavity of the housing 1 to hold them in place. It is then possible to remove the tool to use the module connected to the two fibers inserted therein.

What is claimed is:

1. A splicing module for jointing two optical fibers end-to-end, comprising:

a receiving housing member having a longitudinal cavity with two fiber insertion orifices through two opposite end walls of said cavity, and a longitudinal groove in an inner face of a bottom of the cavity, said orifices opening directly into opposite ends of said groove, respectively, for inserting and jointing said fibers therein, and a longitudinal immobilizing member clipped to said housing member and accommodated in said cavity, said immobilizing member having a longitudinal inner portion extending in said cavity and along said groove to apply an immobilizing pressure to the end-to-end jointed fibers therein, a longitudinal outer portion including a cap closing said cavity, and a transverse central portion connecting said longitudinal inner and outer portions to each other, said longitudinal outer portion having two opposite end arms each facing one of said opposite end walls of said housing member, said end arms and walls being provided with complementary fixing means for holding said immobilizing member either in one of a first position in which a free passage for said fibers is left in said groove and a second position in which the fibers present in said groove are immobilized therein.

2. The splicing module claimed in claim 1, wherein said longitudinal inner portion of said immobilizing member has a shape substantially complementary to that of said cavity and a channel inside thereof to provide a longitudinal pressure distribution along said groove.

3. The splicing module claimed in claim 2, wherein said immobilizing member is a plastics material one-piece assembly and said transverse central portion thereof forms a middle pillar allowing an angular play of said longitudinal inner portion of said immobilizing member relative to said longitudinal outer portion thereof.

4. The splicing module claimed in claim 1, wherein said fixing means on one of said housing member and the longitudinal outer portion of said immobilizing member are at two different heights to define said first and second positions of said immobilizing member.

5. The splicing module claimed in claim 4, wherein said fixing means on each of said housing member and the longitudinal outer portion of said immobilizing member are at two different heights and comprise detents having a different width from one to the other of said heights, said detents holding said immobilizing member in said second position being wider than those holding said immobilizing member in said first position.

6. The splicing member claimed in claim 1, wherein said fixing means are located on an outer face of each of the end walls of the cavity of said housing member and an inner face of each of the end arms of the longitudinal outer portion of said immobilizing member.

* * * * *